United States Patent [19]

Mitchell et al.

[11] Patent Number: 4,519,734
[45] Date of Patent: May 28, 1985

[54] HIGH SPEED SPINDLE WITH PRELOADED BEARINGS

[75] Inventors: William A. Mitchell, Springfield; J. Brent Thompson, Shrewsbury, both of Vt.; John L. Freese, Charlestown, N.H.

[73] Assignee: Ex-Cello-O Corporation, Troy, Mich.

[21] Appl. No.: 391,052

[22] Filed: Jun. 22, 1982

[51] Int. Cl.³ .................. B23Q 5/04; F16C 13/00
[52] U.S. Cl. ............................ 409/231; 384/490
[58] Field of Search ............... 409/231, 232, 101, 108, 409/99, 90, 238, 239, 234; 308/189 A, 207 A; 51/166 TS

[56] References Cited

U.S. PATENT DOCUMENTS

| 2,618,517 | 11/1952 | Erikson et al. | 51/166 TS |
|---|---|---|---|
| 2,819,127 | 1/1958 | Grobey | 308/183 |
| 3,211,060 | 10/1965 | McCann | 409/231 |
| 3,222,991 | 12/1965 | Bone | 409/231 |
| 3,307,890 | 3/1967 | Johansson | 308/189 A |
| 3,352,611 | 11/1967 | Seidel | 308/189 A |
| 3,620,586 | 11/1971 | Maastricht | 308/207 A |
| 3,948,577 | 4/1976 | Gamet | 308/207 A |
| 4,116,506 | 9/1978 | Moritomo et al. | 308/189 A |
| 4,329,000 | 5/1982 | Keske | 308/189 A X |
| 4,400,098 | 8/1983 | Lacey et al. | 308/189 A X |

FOREIGN PATENT DOCUMENTS 1208133  10/1970  United Kingdom ........... 308/189 A

Primary Examiner—William R. Briggs
Attorney, Agent, or Firm—Edward J. Timmer

[57] ABSTRACT

A high speed spindle preferably of the motorized type is described having means for axially preloading the spindle bearings and hydraulic preload locking means for locking the preload against diminution by expected axial pull-out forces exerted on the spindle shaft counter to the preload during machining. The hydraulic locking action is released in the event unexpectedly high, potentially damaging axial pull-out forces are encountered during machining.

19 Claims, 4 Drawing Figures

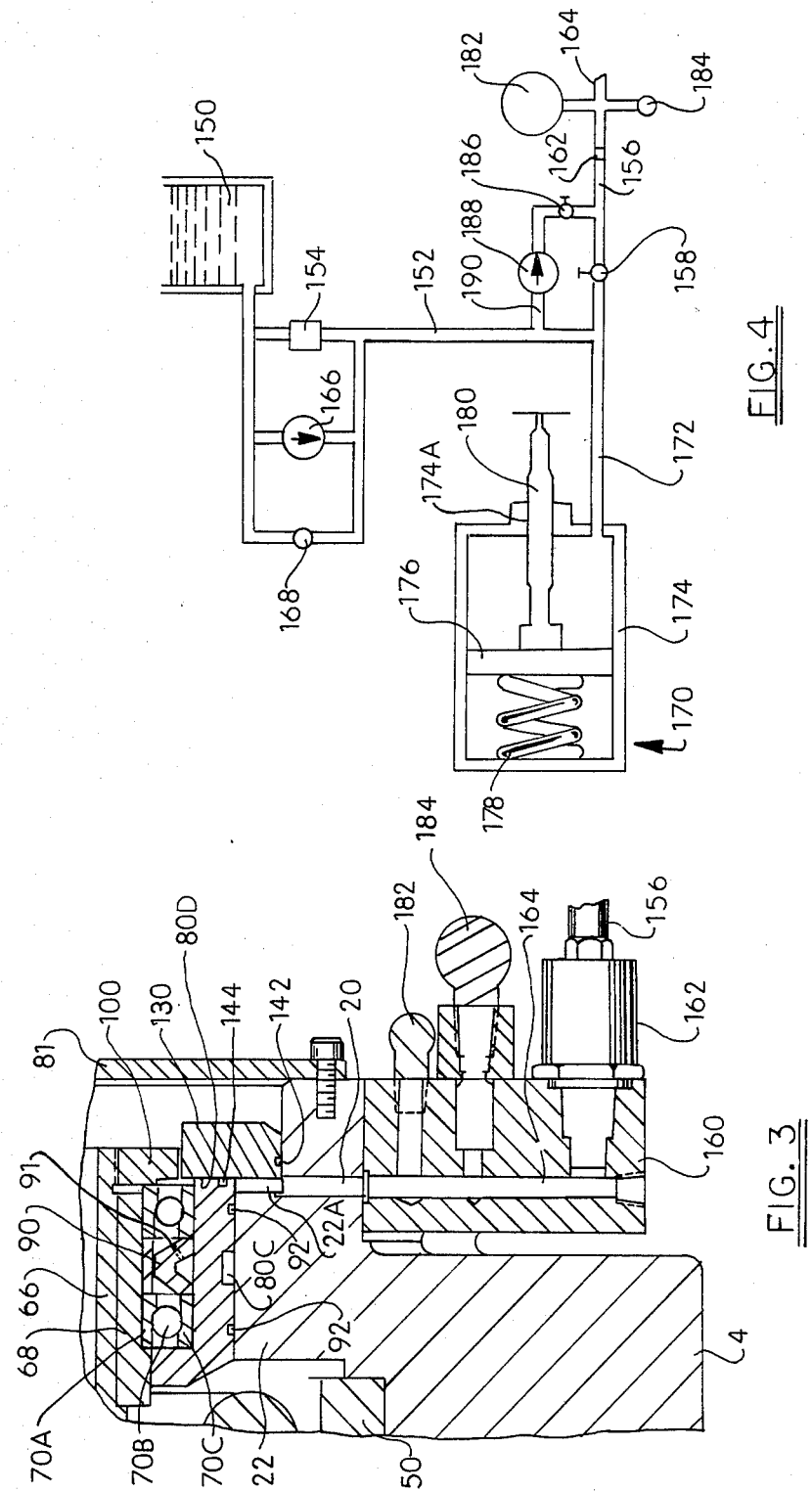

HIGH SPEED SPINDLE WITH PRELOADED BEARINGS

FIELD OF THE INVENTION

The present invention relates to high speed spindle constructions and, in particular, to high speed motorized spindles having preloaded spindle bearings and means to lock the preload on the bearings during machining.

BACKGROUND OF THE INVENTION

High speed motorized spindles were initially developed for precision grinding and over the years have been used for other machining operations involving heavy stock removal such as rotary milling, end milling and end facing. In such spindles, the tool is diectly driven by the rotor of a high frequency, alternating current induction motor with no intervening belts, pulleys or the like to achieve rotational speeds up to 150,000 rpm. The rotor is typically supported in a housing by precision bearings which are axially preloaded to maintain rotor play and vibration within acceptable limits and to accommodate thermal strains generated in the system during operation. Typical prior art high speed spindle constructions including spring preloaded bearings are illustrated in the Moore U.S. Pat. No. 2,502,874 issued Apr. 4, 1950, the Arms U.S. Pat. No. 2,523,983 issued Sept. 26, 1950, the Bryant et al U.S. Pat. No. 2,550,908 issued May 1, 1951 and the Grobey U.S. Pat. No. 2,819,127 issued Jan. 7, 1958, all of common assignee herewith.

A recent improvement in high speed motorized spindle construction including an improved antifriction bearing support and an oil-mist lubrication system is illustrated in the Mitchell and Clark U.S. Pat. No. 4,211,454 issued July 8, 1980 of common assignee herewith. The Mitchell and Thayer U.S. Pat. No. 3,939,944 issued Feb. 24, 1976 also of common assignee herewith provides an oil mist lubrication system for the antifriction bearings of a high speed motorized spindle and an oil-mist blender-distributor unit.

Machine tools having hydraulic mechanisms for preloading high speed spindle bearings are disclosed in the McCann U.S. Pat. No. 3,211,060 issued Oct. 12, 1965 and the Bone U.S. Pat. No. 3,222,991 issued Dec. 14, 1965. In each patent, piston/cylinder assemblies located internally in the spindle construction engage the outer race of the rear spindle bearing to exert a preload on the front and rear bearings. In the McCann patent, the bearing preload is apparently maintained during machining by a motor-driven pump while in the Bone patent a hydraulically expandable sleeve attached to the piston member locks the member in the desired reload position.

The Jones U.S. Pat. No. 3,540,346 issued Nov. 17, 1970 discloses an annular biasing piston member engaging the outer race of a rear spindle bearing to axially preload the front and rear spindle bearings in a machine tool. The spindle is axially adjustable in a rotary sleeve and is clamped in desired axial position in the sleeve by a hydraulically actuated clamping bushing carried by the rotary sleeve.

Multiple piston/cylinder assemblies for varying loading on split-spindle bearings of a motorized spindle and for providing an end thrust on the spindle are disclosed in the Erikson et al U.S. Pat. No. 2,618,517 issued Nov. 18, 1952. Loading of the split bearings is achieved by radially oriented cylinder/piston assemblies and is employed to vary the thickness of the oil film between the bearings as a means to control spindle wobble. End thrust is applied to the spindle in a direction toward the cantilevered spindle end carrying the tool by multiple cylinder/piston assembhes oriented axially in an end collar.

Hydraulic clamping mechanisms for accurately positioning a machine tool spindle are disclosed in the Dever et al U.S. Pat. No. 3,244,028 issued Apr. 5, 1966, the Kampmeier U.S. Pat. No. 3,438,289 issued Apr. 15, 1969 and the Lehmukuhl U.S. Pat. No. 3,545,335 issued Dec. 8, 1970.

High speed motorized spindles adapted specifically for use with a conventional machining center having an automatic tool changer mechanism are disclosed in the Allgeyer U.S. Pat. No. 3,803,981 issued Apr. 16, 1974 and the Hutchins U.S. Pat. No. 4,077,736 issued Mar. 7, 1978.

SUMMARY OF THE INVENTION

It is an object of the present invention to provide a high speed spindle especially of the motorized type described having means for preloading the spindle bearings and means for locking the preload against diminution by axial pull-out forces encountered during machining.

It is another object of the invention to provide a high speed spindle with bearing preload locking means which hydraulically locks the preload against expected axial pull-out forces and which releases the hydraulic locking action in the event unexpectedly high axial pull-out forces are encountered.

It is a further object of the invention to provide a high speed spindle with hydraulic bearing preload locking means which can be operated in an alternative mode that tends to dampen any axial vibrations during machining by fluid damping action.

It is still another object of the invention to provide a high speed spindle with hydraulic bearing preload locking means which locks the spindle shaft position without acting to increase the initial bearing preload when axial pull-out forces are encountered.

It is yet another object of the invention to provide a high speed spindle with hydraulic bearing preload locking means wherein the bearing support and spindle housing form a part of the hydraulic locking system.

In accordance with a typical working embodiment of the present invention, the high speed spindle includes a housing having a tool-driving shaft rotatably disposed therein by journaling in anti-friction bearings means. Preferably, the spindle is of the motorized type having an electric motor therein to rotate the tool-driving rotor shaft at high speeds for machining. The spindle also includes means for axially preloading the bearing means and bearing preload locking means to hydraulically lock the preload against diminution by axial pull-out forces on the shaft acting counter to the bearing preload. The bearing preload locking means is comprised of hydraulic cylinder means associated with the housing portion of the spindle, and a piston means in working hydraulic relation to the cylinder means and coupled to the bearing means in such a manner that axial pull-out forces exerted on the shaft during machining are transmitted to the piston means. A fluid pressure reservoir means is provided to supply fluid to the cylinder means and means is provided for blocking the escape of fluid from the cylinder means during machining to hydraulically lock the bearing preload and shaft position against axial pull-out forces.

In a particular preferred embodiment, the bearing preloading means comprises spring means disposed in the hydraulic cylinder means between the housing and piston means to exert an axial load on the piston means which is transmitted to the bearing means.

In another particular preferred embodiments, the hydraulic bearing preload locking means includes a first fluid pressure reservoir means providing fluid at a positive pressure relative to ambient to the hydraulic cylinder means and valve means therebetween closeable during machining to block or prevent fluid escape from the cylinder means. A second fluid pressure reservoir is also preferably provided in fluid communication with the cylinder means and includes pressure biasing means, such as a spring biased piston, which is set to supply fluid to the cylinder means and which is also set to yield to allow fluid escape to the second reservoir in the event pull-out forces and resultant fluid pressure increases in the cylinder means exceed the expected level. The hydraulic bearing preload locking action is thereby locked against expected pull-out forces and is releasable when unexpectedly high pull-out forces are experienced. Unexpectedly high pull-out forces beyond the capacity of the pressure biased second reservoir to accommodate are preferably relieved by high pressure relief valve means located between the first reservoir and cylinder means in parallel with the aforementioned valve means and functioning to vent fluid into the first reservoir for pressure relief purposes. Furthermore, check valve means is also preferably provided between the first reservoir and cylinder means in parallel with the valve means and high pressure relief valve means to admit fluid into the hydraulic system when fluid pressure drops below ambient during recovery of the spindle position after unexpectedly high pull-out forces have subsided, thereby preventing air suction into the hydraulic locking system.

In even more preferred embodiments of the invention, the spindle housing includes an annular chamber with an open end and an annular end member such as a collar is coupled to the rear spindle bearing means, preferably being attached to a rear bearing cage member positioned between the housing and rear bearing, and overlies the open chamber end to function as piston means in the hydraulic preload locking system in response to axial pull-out and preload forces. Compression springs disposed in the annular chamber between the housing and end member provide the bearing preload through the end member and rear bearing cage.

The above objects, features and advantages of the present invention will be readily understood by reference to the detailed description of preferred embodiments taken with the accompanying drawings.

BRIEF DESCRIPTION OF THE DRAWINGS

FIG. 3 is a fragmentary sectional view along line 3—3 of FIG. 1.

FIG. 4 is a schematic view showing other components of the hydraulic bearing preload locking system.

DESCRIPTION OF THE PREFERRED EMBODIMENTS

Figure 1:
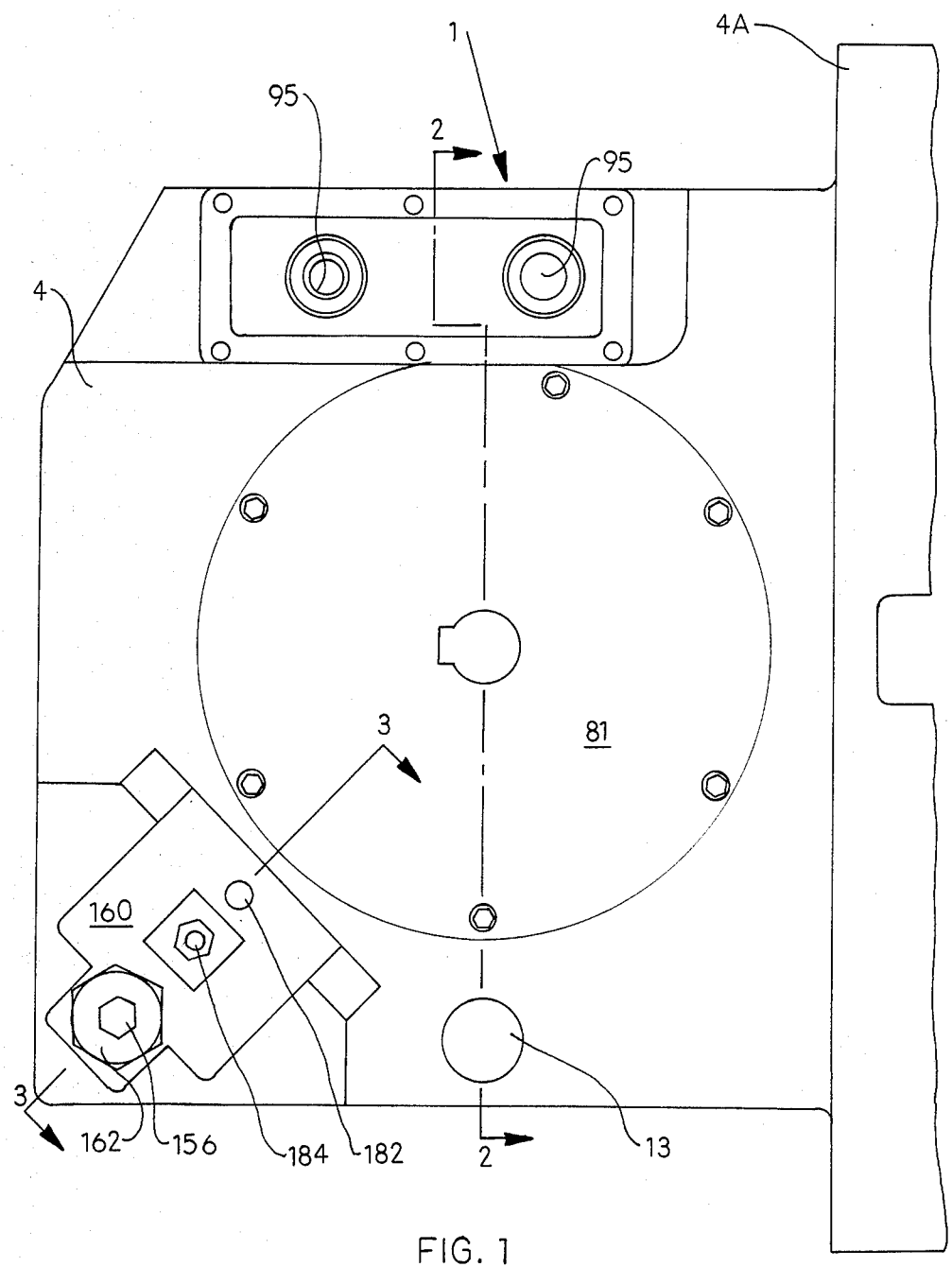
FIG. 1 is an end elevation of an exemplary spindle construction of the invention.
Figure 2:
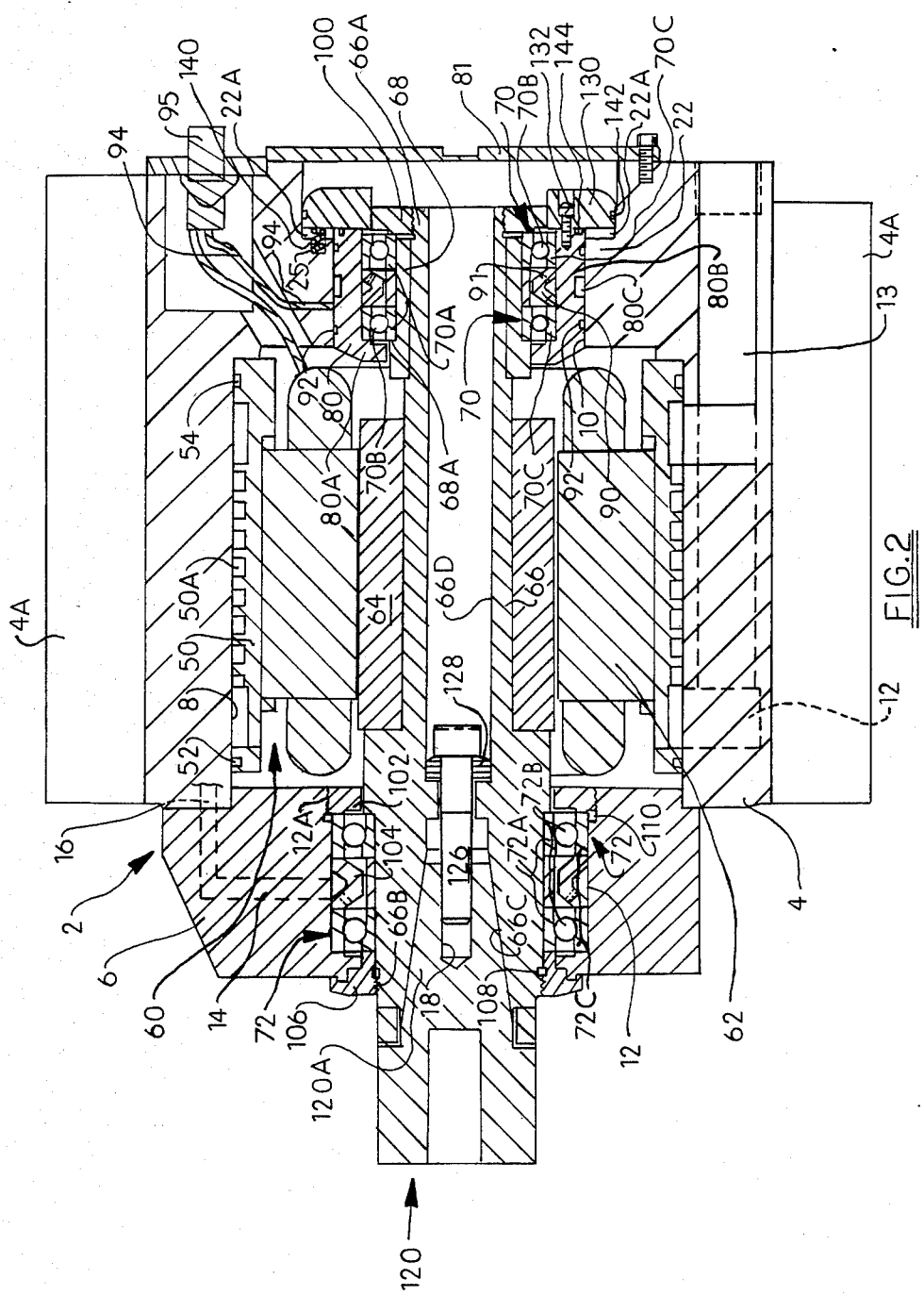
FIG. 2 is a cross-sectional view along line 2—2 of FIG. 1.

A high speed motorized spindle 1 constructed in accordance with the present invention is illustrated in FIGS. 1–3. The spindle includes a housing 2 having a first housing section 4 with a support base 4a and a second housing section 6 securely attached together by machine screws (not shown) or other suitable means known to those in the art. The first housing section includes a large diameter cylindrical bore 8 in which a cooling sleeve 50 having coolant passages 50a is received and sealed by O-rings 52 and 54 and also includes a smaller diameter cylindrical bore 10 adjacent the larger diameter bore. Coolant passages 50a are in communication with suitable supply and discharge passages in the first housing section 4, only coolant discharge passages 12 and 13 being shown. Coolant such as corrosion inhibited water is supplied from a coolant source located exterior of the spindle. The smaller diameter bore 10 is formed by a radially-extending annular bearing support flange 22 in the first housing section. An electric motor 60 of the high frequency alternating current induction type is receive within cooling sleeve 50 and is cooled during operation by a suitable coolant which may include the machining lubricant circulating or flowing through passages 50a. The motor typically includes a stator winding 62 supported in the coolant sleeve and a rotor winding 64 carried on rotatable shaft 66. The right-hand end of shaft 66 (relative to FIG. 2) includes a shrink-fit bushing 68 which is journaled in a pair of rear antifriction bearings 70 each including inner races 70a, balls 70b and outer races 70c, in particular being journaled in the inner races 70a. The outer races 70c are supported against a tubular rear bearing cage member 80 which in turn is supported in the housing against the radially-extending housing flange 22. Between the rear bearings 70 is positioned an oil mist nozzle 90 having multiple apertures 91, two of which are shown, for providing the bearings oil mist at about 15 p.s.i. from a blender-distributor unit (not shown) through passages in the housing 2 and bearing cage member 80. A high speed bearing support assembly having such an oil mist nozzle supplied by a blender-distributor unit is described in the Mitchell and Thayer U.S. Pat. No. 3,939,944 of common assignee herewith, the teachings of which are incorporated herein by reference. The right-hand end of the shaft 66 includes threaded surface 66a on which is threaded a locking collar 100 having an inner side which contacts the inner race 70a of the adjacent antifriction bearing to seat both rear bearings against an annular shoulder 68a on bushing 68 and against the radial rim 80a of the rear bearing cage member 80. The rear cage member 80 includes a tubular sleeve 80b having an annular oil mist receiving groove 80c therearound which receives oil mist and directs the mist via a plurality of radial passages (not shown) into nozzles 90. O-rings 92 are received in smaller grooves in the cage member for sealing purposes. A more detailed description of the rear bearing cage member 80 and its functions is provided hereinbelow. A rear cover plate 81 is attached by screws or the like to the housing to close off the open end defined by housing flange 22.

Thermocouples 94 are used to monitor temperature of the bearing races and to provide an output via leads through coupling 95 to a temperature recording device. The left-hand end of shaft 66 is enlarged and extends into the second housing section 6 having a central bore 12 therethrough. An externally threaded collar 102 is threadably received in a threaded section 12a of the central bore adjacent the first housing section 4. A pair of antifriction bearings 72 similar to the rear bearings but larger in size are supported in the central bore 12. The bearings each include inner races 72a, balls 72b and outer races 72c as well as oil mist nozzles 104 fed an oil mist from a blender-distributor unit (not shown) via radial passage 14 in the second housing section 6 and axial passage 16 in first housing section 4. This particular bearing and bearing lubrication arrangement are described for U.S. Pat. No. 3,939,944 which has already been incorporated herein by reference. An internally threaded locking collar 106 is threadably received on threaded surface 66b of the enlarged shaft end and abuts the inner race 72a to seat both front antifriction bearings 72 against the inner collar 102. Suitable O-ring seals 108 and 110 are associated with inner and outer collars 102 and 106, respectively, for purposes of lubricant sealing.

It is apparent that the enlarged shaft end includes a generally frusto-conical end chamber 66c which is adapted to receive the shank 120a of a tool holder 120. The tool holder 130 is securely held in the chamber by an axial machine screw 126 received in a threaded axial bore 18. Multiple locking washers 128 are positioned under the head of machine screw 126 as shown. To gain access to machine screw 126, a longitudinal bore 66d is provided in the rotor shaft and opens at the right-hand end of the shaft relative to FIG. 2. Those skilled in the art will understand that the tool holder 120 is adapted to carry a suitable tool such as grinding wheel, end mill and the like depending upon the machining operation to be performed. Tool holders for these various operations are well known to those skilled in the art.

The bearing preloading means of the spindle includes an annular end collar 130 which is fastened on the outside axial end 80d of the rear bearing cage member by machine screws 132, only one of which is shown in FIG. 2. The rear bearing support flange 22 of the first housing section 4 includes an annular chamber 22a having multiple spaced counter bores 25 in which preload coil springs 140 are positioned to exert an axial force on end collar 130 toward the right in FIG. 2. It is apparent that end collar 130 overlies the annular chamber 22a and the O-ring seals 142 and 144 are positioned in a suitable groove in end collar 130 and a groove in rear cage member 80. The preload springs 140 are of course selected to exert a desired axial force on end collar 130 which force is transmitted to the rear bearings 70 by rear cage member 80 and to the front bearings 72 by the shaft 66 and collar 106 in known fashion. The preload exerted by springs 140 is adjustable by varying the number and type of springs. A typical bearing preload for spindle operating speeds in the range of 6000 to 18000 rpm for an end milling operation typically is 500 pounds.

An important feature of the inventive spindle construction is that end collar 130 and annular chamber 22a are cooperatively associated as piston means and hydraulic cylinder means, respectively, of the bearing preload locking system. For example, as shown in FIGS. 3 and 4, hydraulic fluid is supplied to chamber 22a from a first fluid pressure reservoir 150 at a slight positive pressure relative to ambient. The slight positive pressure is provided by elevating the first reservoir 150 relative to the other hydraulic preload locking system components to be described hereinafter or by pressurizing the reservoir for example by using a known bladder type expansion tank (not shown). Hydraulic fluid is supplied to chamber 22a via main conduit 152 having a solenoid or control valve 154 therein, feed conduit 156 having a variable orifice valve 158 therein, adapter plate 160 having fitting 162 and oil passage 164, and oil passage 20 in the first housing section 4, FIG. 3. Of course, to supply fluid to the chamber 22a via conduits 152 and 156, control valve 154 and variable orifice valve 158 would be open. During machining, control valve 154 is closed as will be explained in more detail hereinbelow to hydraulically lock the bearing preload provided by springs 140. As shown in FIGS. 2 and 3, O-ring seals 142 and 144 are located between the first housing section 4, rear bearing cage member 80 and end collar 130 for pressure sealing purposes.

In parallel hydraulic circuits with the control valve 154 are a one-way check valve 166 and an automatic high pressure relief valve 168. The check valve functions to admit hydraulic fluid onto the hydraulic bearing preload locking system when pressure drops below the positive pressure of the first reservoir 150 so as to prevent air suction into the system. As will be explained below, the check valve 166 will perform this fluid replenishment function during recovery of the spindle position after unexpectedly high pull-out forces have subsided during machining. The high pressure relief valve 168 functions to vent fluid from the system to the first reservoir 150 when extremely high fluid pressure increases occur in chamber 22a during machining as a result of unexpectedly high pull-out forces on shaft 66 and cannot be accommodated by the spring-biased second reservoir 170 which is in fluid communication with feed conduit 156 through conduit 172. The second reservoir 170 includes a tank 174, a piston member 176 movable in the tank in sealed relation, and a spring 178 to bias the piston member. The bias on the piston member is preset or adjusted by adjustment rod 180 threadably received in threaded opening 174a in the tank. As will become more readily apparent from the discussion hereinbelow, the spring bias on piston member 176 is initially set to supply fluid to chamber 22a and prevent movement of the piston member so long as pull-out forces exerted on shaft 66 during machining do not exceed an expected level. In the event pull-out forces exceed the expected level, the fluid pressure increases in chamber 22a will overcome the spring bias and cause the piston member to move, compressing the spring 178 and relieving the pressure increase in chamber 22a. That is, hydraulic fluid will flow from chamber 22a into the tank 174 to accommodate and relieve the pressure increase caused by pull-out forces which exceed the expected level. In the event fluid pressure in chamber 22a is reduced, the spring loaded reservoir 170 will supply fluid to the chamber.

A pressure gage 182 and pressure transducer 184 are shown connected to feed conduit 164. These components allow fluid pressure fluctuations in chamber 22a resulting from oscillatory and pulse type pull-out forces on shaft 66 to be monitored and recorded (on a strip chart recorder electrically connected to the transducer) during machining and are especially useful in setting and adjusting the spring bias on the second fluid pressure reservoir 170. The pressure transducer 184 with suitable circuitry known to those skilled in the art may also be used to provide fluid pressure-responsive input signals to an adaptive control unit (not shown) which can adjust the operation of the spindle, such as the rotational speed, or any machine on which the spindle may be mounted in response to pull-out forces being exerted on shaft 66 during the entire machining operation.

An optional manual control valve 186 and one-way check valve 188 are shown in a secondary conduit 190 parallel with the variable orifice valve 158. The function of these components will be described in more detail hereinbelow.

OPERATION OF THE INVENTION

In conventional prior art motorized spindles, the spindle bearings are preloaded by a set of springs acting upon the rear bearing cage member in a similar manner as springs 140 act on end collar 130 and rear bearing cage member 80 of this invention. In one machining application involving high speed end milling using a high speed motorized spindle, it has been determined that axial pull-out forces on the rotor shaft toward the front (tool-carrying) end of the shaft exist during the actual milling operation. These pull-out forces may exceed 100 pounds and are directly opposed to the axial forces provided by the bearing preload springs. Thus, the preload provided by the springs may be reduced by an amount equal to the axial pull-out forces on the rotor shaft. The loss of bearing preload on the front spindle bearings could result in a loss in the radial stiffness of the front bearings. This loss, in turn, could cause a decrease in the critical speed of the spindle, an increase in the radial deflection of the tool during milling and possible irreversible damage to the front bearings and spindle shaft.

The present invention is directed to preventing harmful diminution of the bearing preload as a result of expected axial pull-out forces exerted on the spindle shaft and employs the hydraulic bearing preload locking components described hereinabove. In operation, the variable orifice valve 158 would be fully open at all times. Before starting the spindle, the bias of the spring 178 in the second fluid pressure reservoir 170 would be preset such that the piston member 176 would not move unless oil pressures in the chamber 24 higher than the expected pull-out forces, e.g., greater than 100 pounds, are encountered. The control valve 154 would initially be open connecting first reservoir 150 with chamber 22a as already described during warm-up of the spindle and adjusting of the RPM to the desired value. At this stage, the bearing preload force is provided by preload springs 140 and the rear bearing cage 80 would be free to move relative to the spindle housing in order to accommodate unequal thermal expansions of the shaft and housing. If the rear bearing cage member is moved, the hydraulic preload locking system described would allow oil or other hydraulic fluid to flow into or out of the chamber 22a from second reservoir 170 depending on the change in volume of the chamber caused by movement of end collar 130 relative thereto while the first reservoir maintains a constant, slightly higher than atmospheric pressure in the system.

Once operating RPM and thermal stability of the shaft, bearings and housing have been reached as indicated by thermocouples 94, 95 and others and just before actual start of metal cutting, the control valve 154 is closed to close off the oil-containing chamber 22a from the outside and block flow of oil therefrom, except as permitted by the spring biased second fluid pressure reservoir 170. At this stage, the bearing preload is hydraulically locked against expected pull-out forces and metal cutting may begin. However, it should be noted that the bearing preload is locked only up to a certain level of pull-out forces determined by the spring bias on the second fluid pressure reservoir 170. For the sake of illustration, a gradually increasing pull-out force is assumed to be exerted on the shaft 66 as machining takes place. At first there will be no motion of the shaft but the oil pressure in the chamber 22a will gradually rise. Eventually, the oil pressure increase resulting from the pull-out forces will rise to a point where the bias on the piston member 176 in the second reservoir 170 resulting from increasing oil pressure will just equal the opposed force on the piston member provided by spring 178. As oil pressure increases above this level, the piston member 176 will move so as to depress the spring 178 and oil will flow from the chamber 22a to the second reservoir to accommodate the higher than anticipated oil pressure resulting from higher than anticipated pull-out forces. At the same time that piston member 176 begins to move, the spindle shaft 66 will begin to move axially also. Finally, as the oil pressure continues to increase from the still increasing pull-out forces, the piston member 176 and shaft 66 will continue to move until an oil pressure is reached which will cause the automatic high pressure relief valve 168 to open to vent oil into the first reservoir 150. The piston member will then stop moving in the tank 176 but the shaft 66 will keep moving as oil escapes through the relief valve into the first reservoir. Once the high pressure relief valve is caused to open, there can be no more increase in oil pressure in the hydraulic locking system, even though the pull-out force may still be increasing. The high pressure relief valve preferably is designed or selected such that it opens before the piston member 176 can bottom out in tank 174.

Now again for the sake of illustration suppose that the pull-out force stops increasing and instead begins to gradually decrease during metal cutting. As the oil pressure decreases, the high pressure relief valve 168 will close when the preset decreased oil pressure level is reached. As the pull-out force continues to decrease, the oil pressure will start to decrease also. Thus, the piston member 176 in the second reservoir will begin to gradually move back towards its original preset location by action of spring 178 thereon. Oil will be flowing from the spring biased second reservoir back into chamber 22a. Eventually, as the oil pressure continues to decrease, the piston member will reach its initial position abutted against adjustment rod 180. At the same time, the rotor shaft 66 will be gradually returning toward its original position due to the preload action of springs 140. However, the piston member 176 will reach its original position before the shaft 66 reaches its respective initial position since there is not quite as much oil in the locking system as there was when pull-out forces were increasing, some oil still being retained in the first reservoir after venting through the high pressure relief valve. At this stage, the shaft 66 still must move under action of the preload springs a certain distance to achieve its original position but the piston member 176 is abutted against adjustment rod 180 and can move no farther. The oil pressure in the locking system thus becomes slightly less than the pressure in the first reservoir 150, and this reduced fluid pressure causes the check valve 166 to open to admit oil from the first reservoir into the system. Oil will flow through this check valve until the spindle shaft reaches its initial position dictated by the force of the preload springs. In this way, the check valve prevents suction from developing in the hydraulic locking system and prevents air from being accidentally drawn into the system. When the pull-out force is zero again, the spindle shaft will have reached its initial position and the oil pressure in the hydraulic locking system will equal that in the first reservoir 150. The check valve will also close and the volume of oil in the system will be replenished back to its initial amount.

When metal cutting operations are complete, the control valve 154 will be opened to allow accommodation of thermal strains between the spindle housing, bearings and shaft during cool-down by movement of the rear bearing cage member 80.

The spindle may also be operated in a different mode wherein the hydraulic bearing preload locking system functions only to dampen axial forces on the spindle shaft but not lock the preload to any level. In this mode of operation, the spring bias on piston member 176 in the second reservoir would be decreased to the point where there is no bias on the piston member. The variable orifice valve 158 would be adjusted so that the hydraulic locking system would be, in effect, a mass-spring-dashpot system capable of damping out oscillating and random pulses of axially applied spindle shaft forces. The control valve 154 would be closed during machining while during warm-up and cool-down it would be open. The optional manual control valve 186 and check valve 188 in parallel with the variable orifice valve may be opened to make the check valve 188 operable to damp out pull-out forces only, i.e., check valve 188 will admit fluid to chamber 22a on an inward axial movement of shaft 66 into the housing (causing reduced fluid pressure) but will be closed when pull-out forces (axially outward) are exerted on the shaft causing increased pressure in chamber 22a. The high pressure relief valve 168 and check valve 166 in parallel with control valve 154 would still be operable to protect the system from unanticipated high pressure effects and from suction effects.

In the above hydraulic bearing locking illustrations, the oil in the hydraulic bearing preload locking system will be slightly compressible as is known so that there will be some deflection of the shaft 66, however minimal, whenever any pull-out force is applied. Calculations taking the compressibility of the oil into account have shown that such movement is so small that it will have a negligible effect on the front bearing preload. For example, with annular chamber 22a having a cross-sectional area of 11.045 in$^2$, an initial oil volume of less than 10 in$^3$, and a pull-out force of 100 pounds with SAE-30 oil and not including effects of any spring preloading it was found that the axial deflection would be 0.00003 inch toward the left-hand side of FIG. 2. Of course, this axial deflection figure is conservative in that the beneficial effects of the spring preload are not taken into consideration. This axial deflection was then found from ball bearing axial deflection versus thrust load curves (assuming a 375 pounds spring load) to result in a loss of about 20 pounds of preload. This loss amounts to only about 5% of the initial preload on the front bearings.

While the invention has been described by a detailed description of certain specific and preferred embodiments, it is understood that various modifications can be made in any of them within the scope of the appended claims which are intended to also include equivalents of such embodiments.

We claim:

1. In a spindle of the type having a housing and a tool-driving shaft rotatably disposed in the housing by journaling in anti-friction bearing means, the combination of means for axially preloading the bearing means, and bearing preload locking means for locking the preload against axial pull-out forces acting counter to the preload during machining, said preload locking means comprising hydraulic cylinder means associated with the housing, piston means in working hydraulic relation to said cylinder means and coupled to said preloaded bearing means such that axial pull-out forces on the shaft are transmitted to said piston means, first fluid pressure reservoir means in fluid communication with said cylinder means for supplying fluid thereto and means for preventing escape of fluid from said cylinder means to said first reservoir means during machining from expected axial pull-out forces on the shaft to thereby hydraulically lock the bearing preload against substantial diminution by expected axial pull-out forces exerted on the shaft and lock the shaft position and second reservoir means in fluid communication with said cylinder means and having biasing means opposing increases in fluid pressure in said cylinder means from expected axial pull-out forces to prevent fluid escape therefrom from said expected pull-out forces and operable in response to a fluid pressure increase in said cylinder means above a pre-selected level because of unexpectedly high axial pull-out forces during machining for permitting fluid escape from said cylinder means to said second reservoir means to release hydraulic lock on said bearing preload.

2. The spindle of claim 1 wherein portions of the housing form said hydraulic cylinder means.

3. The spindle of claim 1 wherein the means for preventing fluid escape comprises valve means connected between said first reservoir means and cylinder means and closeable during machining to lock fluid in said cylinder means and a relief valve means between said cylinder means and first reservoir means in parallel with said valve means operable in response to a fluid pressure increase in said cylinder means exceeding the pre-selected level to permit fluid escape to said first reservoir means.

4. The spindle of claim 3 wherein the bearing preloading means comprises spring means disposed in said cylinder means between the housing and piston means such that said piston means transmits the preload to the bearing means.

5. In a spindle of the type having a housing and a tool-driving shaft rotatably disposed in the housing by journaling in anti-friction bearing means, the combination of means for axially preloading the bearing means, and bearing preload locking means for locking the preload against axial pull-out forces acting counter to the preload during machining, said preload locking means comprising hydraulic cylinder means associated with the housing; piston means in working hydraulic relation to said cylinder means and coupled to said preload bearing means such that axial pull-out forces on the shaft are transmitted to said piston means, fluid pressure reservoir means in fluid communication with said cylinder means for supplying fluid thereto, means for preventing escape of fluid from said cylinder means during machining to thereby hydraulically lock the bearing preload against substantial diminution by expected axial pull-out forces exerted on the shaft and lock the shaft position including means operable in response to a fluid pressure increase in said cylinder means above a preselected level because of unexpectedly high pull-out forces during machining for permitting fluid escape from said cylinder means to said second reservoir means to release hydraulic lock on said bearing preload, and means for measuring fluid pressure in said cylinder means and generating a fluid pressure responsive signal for input to a control unit.

6. In a high speed spindle of the type having a housing and a tool driving shaft rotatably disposed in the housing by journaling in anti-friction bearing means, the combination of means for axially preloading the bearing means, and bearing preload locking means for locking the preload against axial pull-out forces on the shaft acting counter to the preload during machining, said preload locking means comprising portions of the housing forming hydraulic cylinder means, piston means in sealed working hydraulic relation to said cylinder means and coupled to said preloaded bearing means such that axial pull-out forces on the shaft are transmitted to said piston means, a first fluid pressure reservoir means in fluid communication with said cylinder means providing fluid at a positive pressure relative to ambient, valve means between said first reservoir means and said cylinder means and closeable during machining to prevent fluid from escaping from said cylinder means to said first reservoir means, and second fluid pressure reservoir means in fluid communication with said cylinder means and having pressure biasing means set to oppose increases in fluid pressure in said cylinder means and prevent fluid escape therefrom when expected pull-out forces are encountered and set to yield to allow fluid escape from said cylinder means to said second reservoir means when pull-out forces and resultant fluid pressure increases occur above the expected level, and a high pressure relief valve means in fluid communication between said first reservoir means and said cylinder means in parallel with said valve means and openable during machining to vent fluid from said cylinder means into said first reservoir means in the event ultra-high pull-out forces are encountered beyond the capacity of said biased second reservoir means to accommodate, whereby the bearing preload and shaft position are hydraulically locked against expected pull-out forces when said valve means is closed during machining and the hydraulic locking is releasable by yielding of said second reservoir pressure biasing means and if necessary said relief valve means in the event unexpectedly high pull-out forces are encountered.

7. The spindle of claim 6 wherein the bearing preload locking means further includes a check valve means in fluid communication between said first reservoir means and said cylinder means in parallel with said valve means and high pressure relief valve means for admitting fluid from said first reservoir means into said cylinder means when fluid pressure drops below the positive pressure of said first reservoir means during recovery of the spindle position after ultra-high pull-out forces have subsided, thereby preventing air suction into said cylinder means.

8. The spindle of claim 6 wherein the bearing preload locking means further includes fluid pressure gage means and pressure responsive signal generating, means for measuring fluid pressure in said cylinder means and generating a signal which is fed as an input signal to a spindle control unit for controlling said spindle.

9. The spindle of claim 6 wherein said pressure biasing means of said second fluid pressure reservoir means comprises a piston member and adjustable spring means applying a pressure bias to said piston member with said bias being set to counter balance the increase in fluid pressure in said cylinder means resulting from the maximum expected pull-out force on the shaft.

10. The spindle of claim 6 wherein said bearing preloading means comprises spring means disposed in said cylinder means between the housing and piston means.

11. In a high speed motorized spindle of the type having a housing, an electric motor in the housing, a tool-driving rotor shaft rotatable at high speed by the motor and journaled in front and rear antifriction bearings in the housing, the combination of portions of the housing forming an annular chamber having an open end, an annular end member coupled to said rear bearings such that axial pull-out and preload forces are transmitted therebetween and overlying the open chamber end to close off same and function in the manner of piston means relative to said chamber, spring means disposed in said chamber between the housing and end member to exert a preselected axial load on said end member and thereby preload said front and rear bearings, a first fluid pressure reservoir means in fluid pressure communication with said chamber for providing fluid at a positive pressure relative to ambient to said chamber, sealing means disposed between said housing and end member, valve means between said first reservoir means and said chamber closeable during machining to block the escape of fluid from said chamber to said first reservoir means, a second fluid pressure reservoir means in fluid communication with said chamber and having pressure biasing means set to oppose fluid pressure increases in said chamber and prevent fluid escape therefrom when expected pull-out forces are encountered and set to yield to allow fluid escape from said chamber to said second reservoir means when pull-out forces and resultant fluid pressure increases occur above the expected level, and a high pressure relief valve means in fluid communication between said first reservoir means and said chamber in parallel with said valve means and openable during machining to vent fluid from said chamber to said first reservoir means in the event ultra-high pull-out forces are encountered beyond the capacity of said biased second reservoir means to accommodate, whereby bearing preload and shaft position are hydraulically locked against expected pull-out forces when said valve means is closed during machining and the hydraulic locking is releasable by yielding of said second reservoir pressure biasing means and if necessary by said relief valve means in the event unexpectedly high pull-out forces are encountered.

12. The spindle of claim 11 wherein a one-way check valve means is disposed between the first hydraulic reservoir means and the annular chamber in a hydraulic circuit parallel with said closeable valve means and said high pressure relief valve means and admits fluid from said first reservoir means into said annular chamber when fluid pressure drops below the positive pressure of said first reservoir means during recovery of the spindle position after ultra-high pull-out forces have subsided, thereby avoiding air suction into said chamber.

13. A high speed motorized spindle comprising a housing, an electric motor in the housing, a tool-driving rotor shaft rotatable at high speeds by the motor and journaled in front and rear anti-friction bearings in the housing, a rear bearing cage member disposed between the rear bearing and housing and coupled with said rear bearing for transmission of pull-out and axial preload forces therebetween, said cage member having an axially facing annular end, portions of the housing adjacent said cage member forming an annular chamber with an axially facing open end, an annular collar fastened to the axial end of said cage member and overlying said open chamber end to close off same and function in the manner of piston means relative to said chamber in response to axial pull-out and preload forces, spring means disposed in said chamber between the housing and collar to exert a preselected axial load on said collar to preload said front and rear bearings, a first hydraulic reservoir means in fluid pressure communication with said chamber for providing fluid at a positive fluid pressure relative to ambient to said chamber, sealing means disposed between said collar, housing and cage member, valve means between said first reservoir means and said chamber closeable during machining to prevent fluid from escaping from said chamber and openable during spindle start-up and shut-down, a spring biased second hydraulic reservoir means in fluid pressure communication with said chamber with the spring bias set to oppose fluid pressure increases in said chamber resulting from expected pull-out forces on the shaft and set to yield when pull-out forces and resultant fluid pressure increases occur above the expected level during machining to allow fluid escape from said chamber, a high pressure relief valve means disposed in fluid communication between said first reservoir means and said chamber in parallel with said valve means and which opens during machining to vent fluid into said first reservoir means in the event ultra-high pull-out forces and resultant fluid pressure increases are encountered beyond the capacity of said spring-biased second reservoir means to accommodate, and one-way check valve means disposed in fluid communication between said first reservoir means and said chamber in parallel with said valve means and said high pressure relief valve means to admit fluid from said high pressure relief valve means to admit fluid from said first reservoir means into said chamber when fluid pressure drops below the positive pressure of said first reservoir means during recovery of the spindle portion after ultra-high pull-out forces have subsided, thereby avoiding air suction into said chamber, whereby bearing preload and shaft position are hydraulically locked against expected pull-out forces when said valve means is closed during machining and the hydraulic locking is releasable by yielding of said spring biased second reservoir means and if necessary by said relief valve means in the event unexpectedly high pull-out forces are encountered.

14. The spindle of claim 13 wherein fluid pressure gage means and pressure-responsive signal generating means are disposed between said chamber and one of said first and second reservoir means for measuring fluid pressure in said chamber and generating a signal which is fed to a spindle control unit for controlling the spindle.

15. The spindle of claim 13 wherein the electric motor is a high frequency induction motor.

16. The spindle of claim 13 wherein said first hydraulic reservoir means provides a positive fluid pressure by being elevated relative to said chamber.

17. The spindle of claim 13, wherein said first hydraulic reservoir means provides a positive fluid pressure by being pressurized.

18. In a high speed spindle of the type having a housing and a tool driving shaft rotatably disposed in the housing by journaling in anti-friction bearing means, the combination of means for axially preloading the bearing means, and load dampening means for dampening axial pull-out forces on the shaft acting counter to be preload during machining, said dampening means comprising portions of the housing forming hydraulic cylinder means, piston means in sealed working hydraulic relation to said cylinder means and coupled to said dampening means such that axial pull-out forces on the shaft are transmitted to said piston means, a fluid reservoir means in fluid communication with said cylinder means, variable orifice valve means between said fluid reservoir means and said cylinder means adjusted such that the reservoir means and valve means function as a dashpot means to dampen oscillating axial pull-out forces exerted on the spindle shaft during machining, and a one-way valve means disposed between the fluid reservoir means and cylinder means in parallel with the variable orifice valve means opening for admitting fluid to said cylinder means from said reservoir means when fluid pressure decreases in the cylinder means when the spindle shaft moves axially inward of the housing and closing when fluid pressure increases in the cylinder means from shaft movement axially outward of the housing.

19. In a spindle of the type having a housing and a tool-driving shaft rotatably disposed in the housing by journaling in anti-friction bearing means, the combination of means for axially preloading the bearing means to an initial pre-selected preload level, and bearing preload locking means for locking the initial preload level against axial pull-out forces acting counter to the preload during machining, said preload locking means comprising hydraulic cylinder means associated with the housing, piston means in working hydraulic relation to said cylinder means and coupled to said preloaded bearing means such that axial pull-out forces on the shaft are transmitted to said piston means, fluid pressure reservoir means in fluid communication with said cylinder means for supplying fluid thereto, valve means between said fluid pressure reservoir means and cylinder means closed during machining for preventing fluid flow between said cylinder means and reservoir means from fluid pressure increases in the cylinder means resulting from expected axial pull-out forces, and fluid sealing means between the housing and piston means forming a sealed substantially incompressible fluid-filled chamber between said cylinder means and piston means when said means for preventing fluid flow between said cylinder means and reservoir means is operative during machining whereby the fluid-filled chamber hydraulically locks the initial bearing preload level against substantial diminution by expected axial pull-out forces exerted on the shaft during machining.

* * * * *